United States Patent [19]

Eaton et al.

[11] Patent Number: 5,441,583
[45] Date of Patent: Aug. 15, 1995

[54] METHOD OF USE OF MULTIPLE ADHESIVE FOAM BEAD APPLICATOR

[75] Inventors: Robert Eaton, Minooka; Ross Wilson, Utica, both of Ill.; Donald Partyka, Heath, Ohio

[73] Assignee: Insta-Foam Products, Inc., Joliet, Ill.

[21] Appl. No.: 112,650

[22] Filed: Aug. 26, 1993

Related U.S. Application Data

[62] Division of Ser. No. 835,195, Feb. 13, 1992.

[51] Int. Cl.6 ................................................ B32B 7/14
[52] U.S. Cl. ........................................ 156/71; 156/578; 156/579; 156/291; 401/48
[58] Field of Search ............... 156/71, 578, 579, 291; 118/305, 315; 401/28, 48, 35, 36, 118, 140, 284, 289; 239/753, 722, 734; 222/314, 330, 191, 608, 611.1, 612, 628

[56] References Cited

U.S. PATENT DOCUMENTS

| | | |
|---|---|---|
| 1,277,805 | 9/1918 | Wingers ............................. 401/289 |
| 2,581,678 | 1/1952 | Malin et al. . |
| 2,692,163 | 10/1954 | Geel . |
| 2,752,624 | 7/1956 | Bell ...................................... 401/48 |
| 3,015,837 | 1/1962 | Teall ................................. 401/137 X |
| 3,099,582 | 7/1963 | Ongstad et al. . |
| 3,457,016 | 7/1969 | Gotberg ........................... 401/138 X |
| 3,542,593 | 11/1970 | Pribbernow ..................... 239/722 X |
| 3,562,808 | 2/1971 | Whitley, Jr. . |
| 3,913,837 | 10/1975 | Grant . |
| 4,059,466 | 11/1977 | Scholl et al. . |
| 4,368,604 | 1/1983 | Spielau et al. . |
| 4,629,094 | 12/1986 | Vogel et al. ....................... 401/48 X |
| 4,638,948 | 1/1987 | Marlek ............................. 222/608 X |
| 4,930,706 | 6/1990 | Merlin . |
| 4,962,892 | 10/1990 | Sauer ................................... 239/722 |
| 5,254,167 | 10/1993 | Janoski et al. . |

FOREIGN PATENT DOCUMENTS

| | | | |
|---|---|---|---|
| 753514 | 2/1967 | Canada ............................... 222/608 |
| 489066 | 8/1918 | France ............................... 239/722 |

*Primary Examiner*—Michael W. Ball
*Assistant Examiner*—Richard Crispino
*Attorney, Agent, or Firm*—Lockwood, Alex, FitzGibbon & Cummings

[57] ABSTRACT

A multiple adhesive bead applicator has a handle member and a cross member. A network of adhesive distribution tubes is attached to the application and extends from the handle member to multiple distribution points in a preselected spacing on the cross member. Such an application is useful in a method for applying a cover member, such as an elastomeric membrane or insulation board, to a roofing substrate by first positioning the membrane adjacent a work area, then dispensing multiple beads of an adhesive onto the substrate in a preselected spacing and in a single pass and contacting the adhesive beads with the cover member.

11 Claims, 3 Drawing Sheets

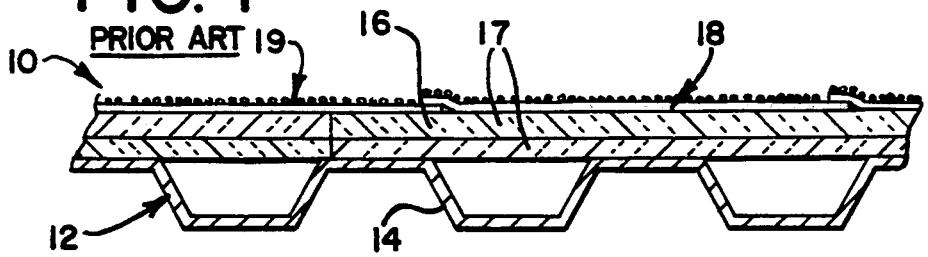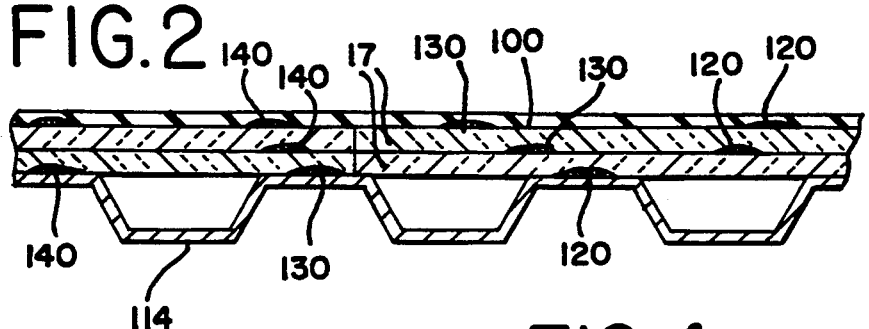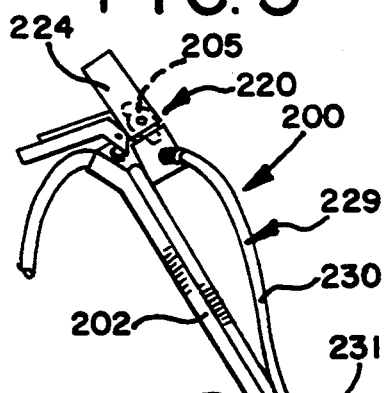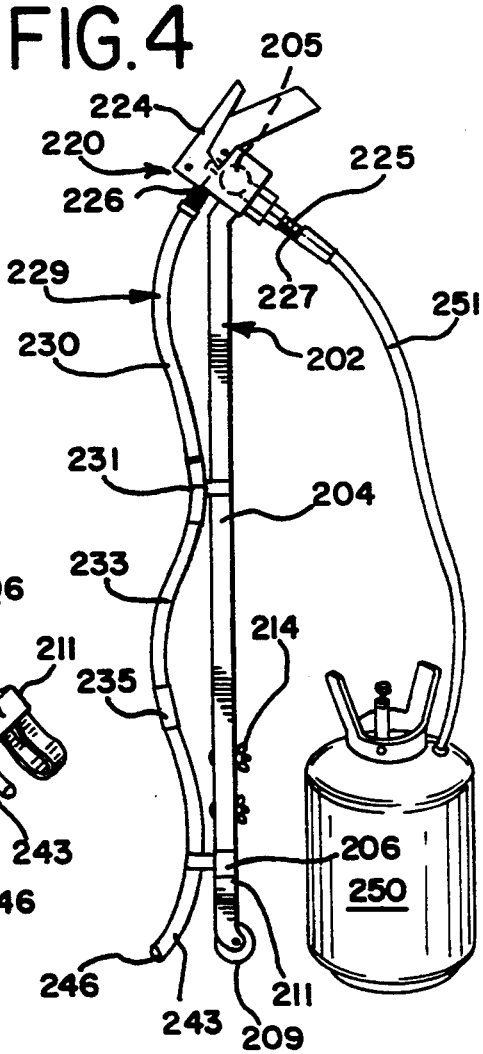

METHOD OF USE OF MULTIPLE ADHESIVE FOAM BEAD APPLICATOR

REFERENCE TO RELATED APPLICATIONS

This application is a divisional of prior application Ser. No. 835,195, filed Feb. 13, 1992.

The present invention relates generally to multiple adhesive application devices and a method for applying multiple adhesive beads to a substrate, and, more particularly, to an application apparatus for applying multiple, spaced-apart beads of an adhesive to a substrate in a single pass. It also particularly relates to a method for adhering covering materials, such as insulation boards, to a roof substrate by dispensing multiple, spaced-apart beads of an adhesive in a single pass onto the substrate and applying the covering material thereto to seal the substrate. The present invention finds particularly utility in the fields of installation of roofing and replacement of roofing.

A typical roof construction include a lower base or support member, such as corrugated steel decking, and one or more intermediate layers of insulation which cover the base member. These intermediate layers are finished with a waterproof layer which may include roofing felt embedded in hot tar or asphalt to form a substantially water-impervious coating or may include an elastomeric membrane. The intermediate layers may be attached to the roof support member by fasteners or by adhesive means. The finish layer may also be attached to the intermediate layers in a similar manner.

Because of the typically large size of roofs in square footage, the finish and intermediate layers can only be applied to the roof in an area large enough to be completed during the workday. Where an adhesive is used to attach these layers to the roof, a first bead of the adhesive having a preselected width is applied to the roof substrate. An edge of a covering member, such as a rigid insulation board is carefully embedded into the first adhesive layer, and a second bead of adhesive is subsequently applied to the roof at the preselected distance from the first adhesive bead. The roof covering member is then attached to the second adhesive bead and the process is repeated for subsequent adhesive beads. Because adhesives have a limited curing time, after which time they lose their adhesive properties, only a few adhesive layers may be laid at a time.

The present invention is directed to an apparatus which overcomes the above-mentioned disadvantages and accordingly concerns itself with a low cost, hand-held multiple adhesive bead applicator which dispenses multiple beads of adhesive in a predetermined spacing to a substrate in a single pass, thereby reducing the amount of time required to apply adhesives in roofing installation and reconstruction.

This is accomplished by providing a rake-like apparatus having a handle member joined to a base member. An adhesive-conveying network of multiple flexible tubes extends along the handle from a handle valve to the base member where it is dispensed through multiple application tubes affixed to the base member. The network of adhesive application tubes includes a primary adhesive distribution tube and at least two secondary adhesive on tubes interconnected to a plurality of adhesive application tubes mounted on the base member. The adhesive flows out of the application tubes onto the substrate. The application tubes are positioned at a preselected distance from the roof substrate by means of skids or wheels such that the adhesive of each application tube is applied directly to the roof substrate. In this manner, multiple beads of adhesive may be dispensed onto the roof substrate in a single pass which reduces the time for installation of a roof.

Accordingly, it is an object of the present invention to provide a multiple adhesive bead application apparatus which is of low cost and which is easily operated by a single individual, the apparatus having a network of adhesive distribution passages leading from an inlet disposed on a handle member to a plurality of adhesive application tubes disposed on a cross-member, the adhesive application tubes being disposed in a predetermined spacing along the cross member and spaced apart from a substrate by suitable members such as skids or wheels.

Another object of the present invention is to provide a method for applying one or more covering members, such as rigid insulation boards or a flexible membrane to a roof substrate by applying multiple, spaced-apart adhesive beads to the substrate in a single pass and then contacting the covering members to the multiple adhesive beads, in which a multiple adhesive bead applicator dispenses the adhesive beads from a single pressurized adhesive supply source.

These and other objects of the present invention will become more readily apparent from a reading of the following detailed description taken in conjunction with the accompanying drawings wherein like reference numerals refer to like parts.

BRIEF DESCRIPTION OF THE DRAWINGS

In the course of this description, reference will be made to the attached drawings in which:

FIG. 1 is a sectional view of one typical roof construction;

FIG. 2 is a sectional view of another typical roof construction.

FIG. 3 is a perspective view of a multiple bead adhesive dispensing apparatus in operation.

FIG. 4 is an end view of the multiple bead adhesive dispensing apparatus of FIG. 3, but having an alternate positioning means.

DETAILED DESCRIPTION OF THE PRESENT INVENTION

Figure 3A:
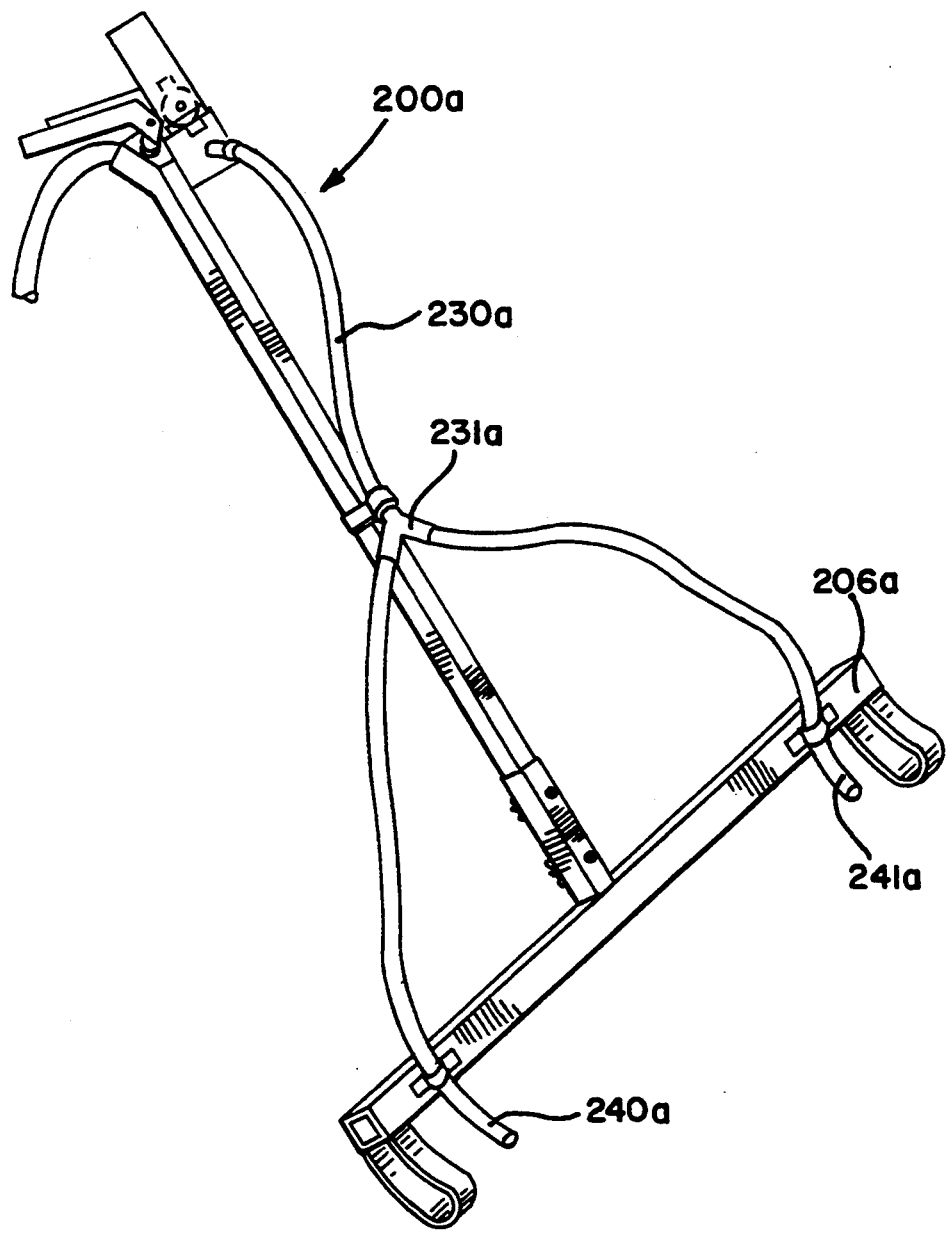
FIG. 3A is a perspective view of an alternate embodiment of a multiple bead adhesive dispensing apparatus.

FIGS. 1 and 2 illustrate cross-sections of two styles of representative roof construction. The roof 10 has a base or support member 12, shown as a section of corrugated steel decking 14, extending between structural columns and girders of the structure to provide structural support of the roof 10. The roof substrate 16 may include the roof decking 14 and one or more layers of rigid insulation 17 in the form of extruded polystyrene or cork boards. A waterproof top layer 18 formed from either one or more layers of roofing felt 19 embedded in a hot tar or asphalt and having a gravel mixture 15 applied thereto serves as a finish layer. This roof construction is commonly referred to as a "built-up roof". An alternate roof construction as shown in FIG. 2, utilizes a similar support member 114 and similar insulation layers 117 but includes as a finish layer, a flexible, impervious elastomeric membrane 100, adhered to the roof intermediate layers or substrate.

In such roof constructions, the roofing crew adheres the intermediate insulation boards 117 to the decking 114 by applying a first bead 120 of an adherent compound to the decking 114. Second or third beads 130, 140 of the adherent compound are also deposited from a single stream applicator (not shown) to the decking 114. Subsequent to this application of adherent compound, the insulation boards 117 are contacted to the decking 114 and adherent compound beads 120-140. When one layer of insulation board is installed, the process may be repeated to attach a covering layer of insulation board to the same. A flexible, elastomeric membrane 100 may be further adhesively attached to the top most layer of the substrate 116 to provide a finished cover layer.

Adhesives are used to adhere the covering members to the decking or base member 114 as well as adhere the insulation boards to each other. Such adhesives may be single component, moisture-cured adhesive and may have a tack-free time of 30 minutes or less. Accordingly, the application of individual, separate beads of adhesive 120, 130, 140 is time-intensive because it requires the roofer depositing the adhesive beads 120 to ensure that they are applied in a predetermined spacing and contacted by the membrane prior to the foam curing.

The present invention eliminates the need for individually depositing such individual adhesive beads and aptly further reduces the labor required for application in that it permits an individual to dispense multiple adhesive beads in a predetermined spacing in a single pass. In accordance with a method of the present invention, the roofer dispenses multiple adhesive beads in a predetermined spacing to the roof substrate and subsequently contacts a cover member to the substrate member.

Turning to FIGS. 3 and 4, a multiple bead adhesive distribution apparatus 200 particularly suitable for use in a method of the present invention is illustrated. The adhesive distribution apparatus 200 includes a rake-like applicator 202 having a handle member 204 extending down to a base, or cross-member 206. The cross member 206 includes means for positioning the cross-member 206 in relation to the substrate 116, such as a pair of skid portions 208 disposed at opposite ends 210, 211 thereof. Alternately, the cross-member 206 may utilize wheels 209 (FIG. 4) or another suitable mechanism to distance the cross-member 206 from the substrate. The cross member 206 is preferably connected to the handle member 204 by a suitable interconnection means such as nuts and bolts 214, to give the adhesive distribution apparatus 200 a "knock-down" nature, thereby permitting it to be assembled and unassembled in a minimum amount of time at the job site.

An adhesive transfer assembly 220 is mounted near the top of the handle member 204 and may include a valve 205 contained therein which is operable by way of a handle 224. The valve 205 controls the supply of adhesive transmitted through the applicator 202. In this regard, the adhesive transfer assembly 200 includes an inlet 225 and an outlet 226. The inlet 225 includes conventional interconnection fittings 227 which permit quick and easy connection to a supply hose 251 of a portable, pressurized adhesive supply source 250. The outlet 226 communicates with a network of adhesive distribution tubes 229 by way of a specific connection to a primary adhesive distribution tube 230. The primary adhesive distribution tube 230 extends partially down the to a wye-type fitting 231 which splits the flowpath of the first distribution tube 230 into two separate and equal flowpaths defined by secondary adhesive distribution tubes 232, 233. These secondary adhesive distribution tubes 232, 233 also engage similar wye-type fittings 234, 235 which again serve to split the secondary flowpaths into third, or dispensing flowpaths defined by adhesive application tubes 240-243, with four such application tubes being illustrated in FIGS. 3 and 4. Alternatively, as shown in FIG. 3A, the apparatus 200a may utilize a primary adhesive distribution tube 230a directly connected by a wye fitting 231a to the adhesive application tubes 240a, 241a and spaced apart on the cross member 206a.

These application tubes 240-244 are mounted on the rake cross-member 206 by conventional means, such as adjustable and selectively releasable pipe clips 245, which permit the application tubes 240-243 to be easily adjusted to position the tube outlets 246 of the same in a predetermined spacing away from the roof substrate 116, the distance between the adhesive application tube outlets 246 is further controlled by the operator adjusting the angle of the applicator 202 relative to the roof substrate. The skids 208 or wheels 209 permit the applicator 202 to be slid or pushed by the operator along the roof substrate. The adhesive application tubes 240-243 are spaced apart on the applicator cross-member 202 in a predetermined spacing dictated by the adhesive strength or the desired spacing between adjacent adhesive beads. It has been found that an application tube spacing of approximately one foot gives preferred results.

The secondary adhesive distribution tubes 232, 233 are preferably of the same length so that act as parallel pipes such that the head losses of the adhesive as it travels through the applicator are the same in any of the secondary tubes 232, 233. The same holds true for the individual adhesive application tubes 240-243 which also share a common length and thus the adhesive will exit the application tubes 232, 233 onto the substrate 116 at the same pressure such that all the adhesive beads dispensed are generally equal in density and diameter. Similarly, the diameter of the all of the component tubes which make up the adhesive distribution network 229 are uniform. Preferred results are obtained by using flexible tubes having a diameter of between approximately one-half inch and three-quarters inch. Because the adhesive used in such an applicator 202 is generally non-expanding, the resultant diameter of the applied adhesive bead 120 will be substantially the same as the application tube diameter.

A preferred adhesive which gives particularly desireable results is a frothed urethane pre-polymer adhesive, such as the INSTA-STIK TM adhesive manufactured and sold by Insta-foam Products, Inc. of Joliet, Ill. which is a single component moisture-cured adhesive. It is also preferable that such an adhesive be maintained in a pressurized single adhesive supply source 250 in which the adhesive is contained in a pressurized canister. A frothing agent may be included in the cannister which froths the adhesive upon exit from the supply source 250 and applicator 202 such that the dispersed adhesive temporarily expands to permit it to maintain a desired thickness or height. Eventually, the adhesive settles. This initial expansion upon application serves to increase the surface contact between the two materials being adhered together.

Figure 5:
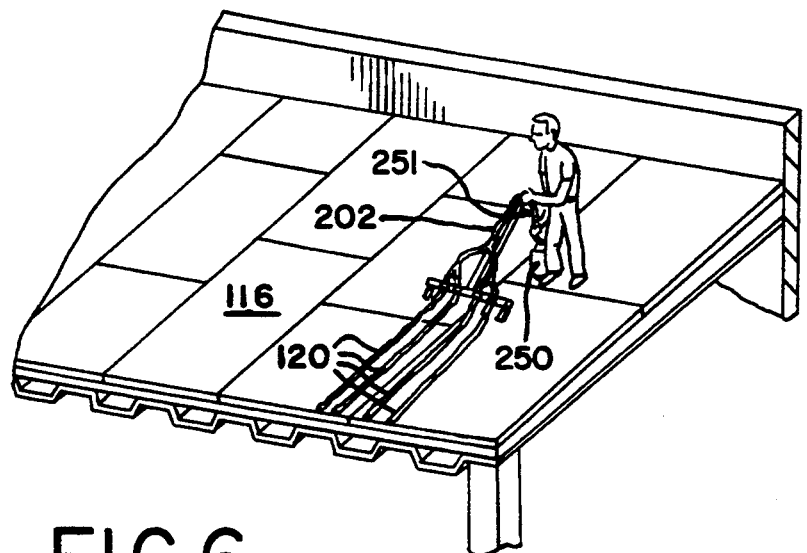
FIG. 5 illustrates a method of adhering a covering member to a roof substrate, and particularly, the step of dispensing multiple, spaced-apart beads of adherent compound from the dispensing apparatus of FIG. 3 onto the roof substrate.
Figure 6:
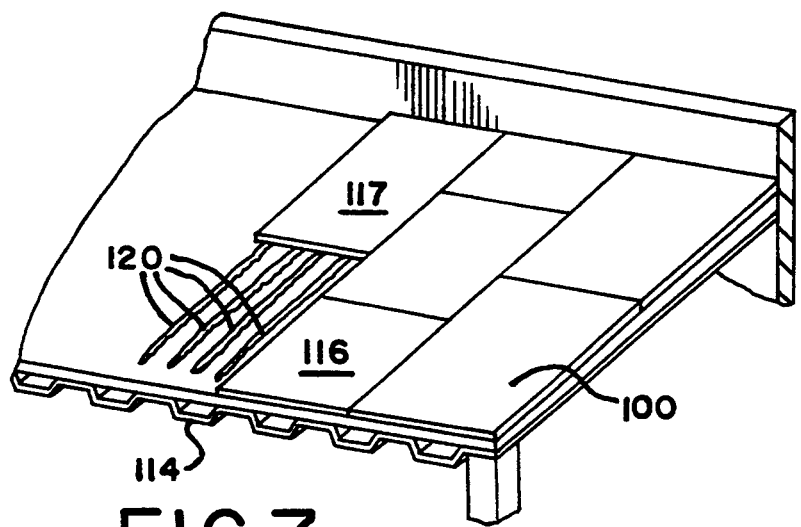
FIG. 6 illustrates the step of contacting a generally rigid insulation board cover member to a roof substrate.
Figure 7:
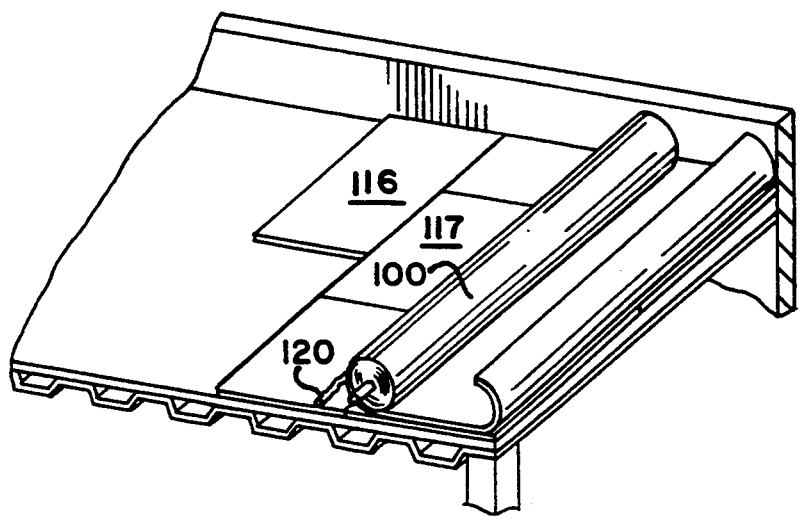
FIG. 7 illustrates an alternate step of contacting a flexible membrane cover member to the multiple beads of adhesive deposited on the roof substrate.

Turning now to FIGS. 5-7, a method of applying a cover member 100, to the roof substrate 116 is illustrated. The cover member may be either insulation boards 117 or a flexible membrane 100. The operator connects the pressurized adhesive supply source 250 to the applicator 202 by connecting the two together with the supply hose 251. In some instances, the adhesive supply source 250 must be agitated, such as by shaking to ensure that any frothing agent utilized to froth the adhesive will appropriately dissolve. After connection to the adhesive supply source 250, the applicator 202 is then positioned adjacent the membrane material supply and the applicator valve 205 is manually operated by the operator by way of applying pressure to the nozzle handle 204. As adhesive begins to dispense out of the application tubes, the applicator 202 is pushed or dragged along a predesignated line to apply multiple adhesive beads 120 (four such beads being shown in the FIGURES) to the substrate 116. Covering material such as extruded polystyrene or cork boards 117 are then contacted to the adhesive beads 120. In FIG. 7, a membrane 100 is shown as the covering material adhesive beads are dispersed onto the insulation board 117 by way of applicator 202 and the membrane is then rolled onto the adhesive beads 120 and into contact therewith. The adhesive beads 120 may be spaced out after contact with the cover members by exerting pressure onto the cover members above the beads. Another pass is made with the applicator 202 and the cover member contacting step is repeated. Thus, the present invention efficiently permits multiple beads of adhesive to be applied on the substrate in a single pass, thereby substantially reducing the time for installation.

It will be appreciated that the embodiments of the present invention that have been discussed herein are merely illustrative of a few applications of the principles of the invention. Numerous modifications may be made by those skilled in the art without departing from the true spirit and scope of the invention.

What is claimed is:

1. A method of adhering at least one cover member to a roofing substrate, comprising the steps of:
   dispensing, under pressure, multiple beads of an adherent compound in equal amounts onto the roofing substrate in a single pass from an application apparatus having a primary distribution tube in fluid communication with multiple secondary distribution tubes, the multiple secondary distribution tubes being in fluid communication with multiple application tubes, each of said secondary distribution tubes being of substantially the same length to promote distribution of said equal amounts of said adherent compound multiple beads onto said roofing substrate, the apparatus receiving said adherent compound under pressure from a pressurized adherent compound supply source, and
   applying the covering member to the roofing substrate such that said cover member contacts the adherent compound multiple beads before said adherent compound multiple beads cure,
   and allowing said adherent compound multiple beads to cure such that an adhesive bond is established between said cover member and said roofing substrate.

2. The method of claim 1, wherein said cover member is a flexible, elastomeric membrane and said roofing substrate includes an insulation board.

3. The method of claim 1, wherein said cover member is a generally rigid insulation board and said roofing substrate includes at least one insulation board.

4. The method of claim 1, wherein said cover member is a generally rigid insulation board and said roofing substrate includes at least one steel decking member.

5. The method of claim 1, wherein said adherent compound multiple beads have a diameter of between approximately one-half inch and approximately three-quarters inch after dispensing onto said roofing substrate.

6. The method of claim 1, wherein said adherent compound is a general non-expanding, moisture-cured frothed urethane prepolymer.

7. The method of claim 1, wherein said adherent compound supply source is portable and is connected to said application by an adherent compound delivery tube, the applicator having a dispensing valve assembly disposed on a handle member thereof, the dispensing valve assembly being capable of operation with one hand.

8. A method of adhering a layer of a cover material to a roofing substrate, comprising the steps of:
   providing a pressurized foam adhesive supply source;
   dispensing equal amounts of the adhesive to the roofing substrate in the form of multiple beads of said foam adhesive in a single pass from the adhesive supply source by way of interconnecting said foam adhesive supply source to an application apparatus having a primary adhesive distribution tube in fluid communication with multiple secondary adhesive distribution tubes, the multiple secondary adhesive distribution tubes being in fluid communication with multiple adhesive application tubes, each of said multiple adhesive application tubes cooperating with said multiple secondary distribution tubes to define a plurality of spaced-apart foam adhesive passages, each of the passages having a equal length and extending between said primary distribution tube and said roofing substrate, whereby said equal amounts of said foam adhesive are dispensed in each of said multiple beads;
   applying the cover material to said roofing substrate such that said cover material contacts the adhesive multiple beads before said adhesive multiple beads cure, and allowing said adhesive multiple beads to cure such that an adhesive bond is established between said cover material and said roofing substrate.

9. A method of adhering at least one cover member to a roofing substrate by depositing multiple beads of an adherent compound in equal amounts on to the roofing substrate, comprising the steps of:
   providing a supply source containing a predetermined supply of the adherent compound under pressure;
   connecting the supply source to a dispensing apparatus for dispensing said adherent compound equal amounts as said multiple beads, the dispensing apparatus having a primary distribution tube, a plurality of secondary distribution tubes and a plurality of adherent compound dispensing tubes, the primary distribution tube engaging at one end thereof a connection from said adherent compound supply source and engaging at the other end thereof a fluid connection to said secondary distribution tubes, each of said secondary distribution tubes extending between said primary distribution tube connection and a plurality of connections to said dispensing tubes, said dispensing tubes extending between secondary distribution tube connections and openings of said dispensing tubes disposed at an end of said dispensing apparatus, each of said dispensing tubes and secondary distribution tubes cooperating to define a plurality of adherent compound flow passages of substantially equal length extending between said primary distribution tube and said dispensing tube;

dispensing multiple beads of said adherent compound from said supply source onto the roofing substrate in a single pass by introducing said adherent compound into said primary distribution tube under pressure of said adherent compound supply source, whereby said adherent compound flows through said secondary distribution tubes and out of said apparatus via said dispensing tubes in substantially equal amounts onto said roofing substrate establish multiple, spaced-apart beads of adherent compound on said roofing substrate;

applying a cover member to said roofing substrate such that one surface of the cover member contacts said plurality of spaced-apart adherent compound beads while said beads are still adherent; and, allowing said adherent compound beads to cure so as to establish an adhesive bond between said cover member and said roofing substrate.

10. The method of claim 9, wherein said adherent compound is a generally non-expanding, moisture-cured, frothed urethane pre-polymer.

11. The method of claim 9, wherein said adherent compound is an adhesive foam.

* * * * *